United States Patent
Janish et al.

(10) Patent No.: US 10,819,088 B2
(45) Date of Patent: Oct. 27, 2020

(54) WATER BARRIER SYSTEM FOR AN ELECTRICAL PANEL

(71) Applicant: LEVITON MANUFACTURING CO., INC., Melville, NY (US)

(72) Inventors: Zachary Janish, Melville, NY (US); Ronald Jansen, Melville, NY (US); Michael Kamor, Melville, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 232 days.

(21) Appl. No.: 16/059,598

(22) Filed: Aug. 9, 2018

(65) Prior Publication Data

US 2020/0052469 A1 Feb. 13, 2020

(51) Int. Cl.
*H02G 3/08* (2006.01)
*H02B 1/28* (2006.01)
*H02B 1/06* (2006.01)
*H02B 1/30* (2006.01)

(52) U.S. Cl.
CPC ............... *H02B 1/28* (2013.01); *H02B 1/06* (2013.01); *H02B 1/30* (2013.01); *H02G 3/088* (2013.01)

(58) Field of Classification Search
CPC . H02B 1/28; H02B 1/06; H02B 1/063; H02B 1/30; H02G 3/088; H02G 3/08; H02G 3/081; H05K 5/00; H05K 5/02
USPC ........... 174/50, 50.5, 58, 480, 481; 361/601, 361/641, 679.01
See application file for complete search history.

(56) References Cited

U.S. PATENT DOCUMENTS

| 3,912,348 | A | * | 10/1975 | Seymour | E06B 5/006 312/100 |
| 5,703,325 | A | * | 12/1997 | Yamaguchi | H02G 3/088 174/50 |
| 5,914,460 | A | * | 6/1999 | Mowery | H02B 1/28 174/17 CT |
| 5,957,555 | A | * | 9/1999 | Kohler | H02B 1/30 211/26 |
| 6,005,188 | A | | 12/1999 | Teichler et al. | |
| 6,102,498 | A | * | 8/2000 | Kohler | H02B 1/28 312/223.1 |
| 2005/0047097 | A1 | | 3/2005 | Johnson et al. | |
| 2006/0012947 | A1 | * | 1/2006 | Nakata | H05K 7/20154 361/600 |

(Continued)

OTHER PUBLICATIONS

International Search Report and Written Opinion for the International Patent Application No. PCT/US2019/040270, dated Sep. 16, 2019, 16 pages.

*Primary Examiner* — Angel R Estrada

(57) ABSTRACT

A water barrier system for use in conjunction with an electrical panel to control water intrusion into and within the electrical panel is disclosed. In use, the water barrier system provides one or more barriers to prevent, or at least inhibit, water from entering the electrical panel, and/or to direct water, which has entered the electrical panel. The water barrier system may include one or more barriers extending from an interior surface of the electrical panel to block the migration of water, one or more weep holes in fluid communication with one or more channels to direct water that encounters or comes into contact with a top surface of the electrical panel, and/or one or more troughs to direct water that encounters or comes into contact with the top surface of the electrical panel.

26 Claims, 9 Drawing Sheets

(56) References Cited

U.S. PATENT DOCUMENTS

2006/0254795 A1 11/2006 Thrift et al.
2009/0223696 A1 9/2009 Gawoski
2012/0262037 A1 10/2012 Qin
2016/0234953 A1* 8/2016 Ellingson ............... H05K 5/061
2016/0241007 A1 8/2016 Tremaine et al.

* cited by examiner

WATER BARRIER SYSTEM FOR AN ELECTRICAL PANEL

FIELD OF THE DISCLOSURE

The present disclosure relates generally to electrical panels, and more particularly to a water barrier system for directing (e.g., preventing, inhibiting, controlling, etc.) water migration relative to an electrical panel.

BACKGROUND OF THE DISCLOSURE

Electrical panels such as, for example, circuit breaker panels, relay panels, or the like, are well known. In a conventional power distribution system, power from a utility may be fed to an electrical panel which, in turn, may feed a series of branch circuits. To provide protection for the branch circuits, the electrical panel may include a main breaker to control the supply of power from the primary power supply to the branch circuits. To protect the individual branch circuits, the electrical panel may include an individual circuit breaker for each branch circuit. Additionally, within a standard electrical panel, electrical components such as circuit breakers, relays, control circuitry, wiring (such as some low voltage, communication wiring, etc.) or the like can be located.

In certain geographic areas, electrical panels may be located externally and thus subject to environmental elements (e.g., moisture, rain, snow, etc.). As a result, it is important that the electrical components within an electrical panel be protected from the environmental elements. Moreover, in some installations, the electrical panel may be mounted in a semi-flush manner such that a rear portion of the panel may be located within a cavity of the structure or wall while a front portion of the panel may extend exteriorly of the wall or structure.

Additionally, improper installation of the electrical panel and surrounding structure or wall may lead to water intrusion into the structure or wall in which the panel is mounted. That is, in various installations, the electrical panel may be mounted to one or more studs of a structure or wall. Thereafter, one or more layers of material such as, for example, plywood, stucco, sheetrock, etc., may be mounted to the studs. The one or more layers may be cut to allow at least the front portion of the electrical panel to extend therethrough. As a result, gaps may be formed between the one or more layers of material and the electrical panel. Additionally, gaps may be formed between the various layers of material. During use, water may be able to contact and penetrate the electrical panel as a result of incorrect or inadequate sealing of these various gaps. Thus, electrical panels located indoors may also be subject to unintended water exposure or leakage.

It is with respect to these and other considerations that the present improvements may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is an electrical panel including, in one example embodiment, a back surface, a front surface, a top surface, a bottom surface, and first and second side surfaces defining an interior portion to house one or more electrical components. The electrical panel further including one or more flanges extending from the surfaces of the electrical panel to couple the electrical panel to a structure, the flanges dividing the electrical panel into front and rear portions. The electrical panel further including a barrier extending from an interior surface of the electrical panel, the barrier being adapted and configured to inhibit migration of water from the front portion of the electrical panel to the rear portion of the electrical panel, wherein the barrier is located between the one or more flanges and the front surface of the electrical panel.

The barrier may extend from the interior surface of the bottom surface of the electrical panel, the barrier being adapted and configured to inhibit water from migrating towards the rear portion of the electrical panel along the bottom surface of the panel.

In another example embodiment, an electrical panel may include a back surface, a front surface, a top surface, a bottom surface, and first and second side surfaces defining an interior portion to house one or more electrical components. The electrical panel further including one or more flanges extending from the surfaces of the electrical panel to couple the electrical panel to a structure, the flanges dividing the electrical panel into front and rear portions. The electrical panel further including a cover to at least partially cover a portion of the top surface of the electrical panel, the cover including a top surface, a front surface, first and second side surfaces, and first and second weep holes, the first and second weep holes being adapted and configured to enable water to pass through the top surface of the cover. The first and second weep holes may be positioned adjacent to first and second side surfaces, respectively, of the cover. The cover may further include first and second channels in fluid communication with the first and second weep holes, respectively.

In another example embodiment, an electrical panel may include a back surface, a front surface, a top surface, a bottom surface, and first and second side surfaces defining an interior portion to house one or more electrical components. The electrical panel further including one or more flanges extending from the surfaces of the electrical panel to couple the electrical panel to a structure, the flanges dividing the electrical panel into front and rear portions. The electrical panel may further include a trough formed in the top surface of the electrical panel, the trough extending a width of the electrical panel.

The trough may be positioned adjacent to a portion of the flanges extending from the top surface of the electrical panel, the trough extending beneath the portion of the flanges so that the trough is in fluid communication with the rear portion of the top surface of the electrical panel. Additionally, the electrical panel may further include one or more vertically extending channels formed in one of the first and second side surfaces of the electrical panel, the trough formed in the top surface of the electrical panel being in fluid communication with the one or more vertically extending channels.

BRIEF DESCRIPTION OF THE DRAWINGS

By way of example, a specific embodiment of the disclosed device will now be described, with reference to the accompanying drawings, in which.

Figure 1:
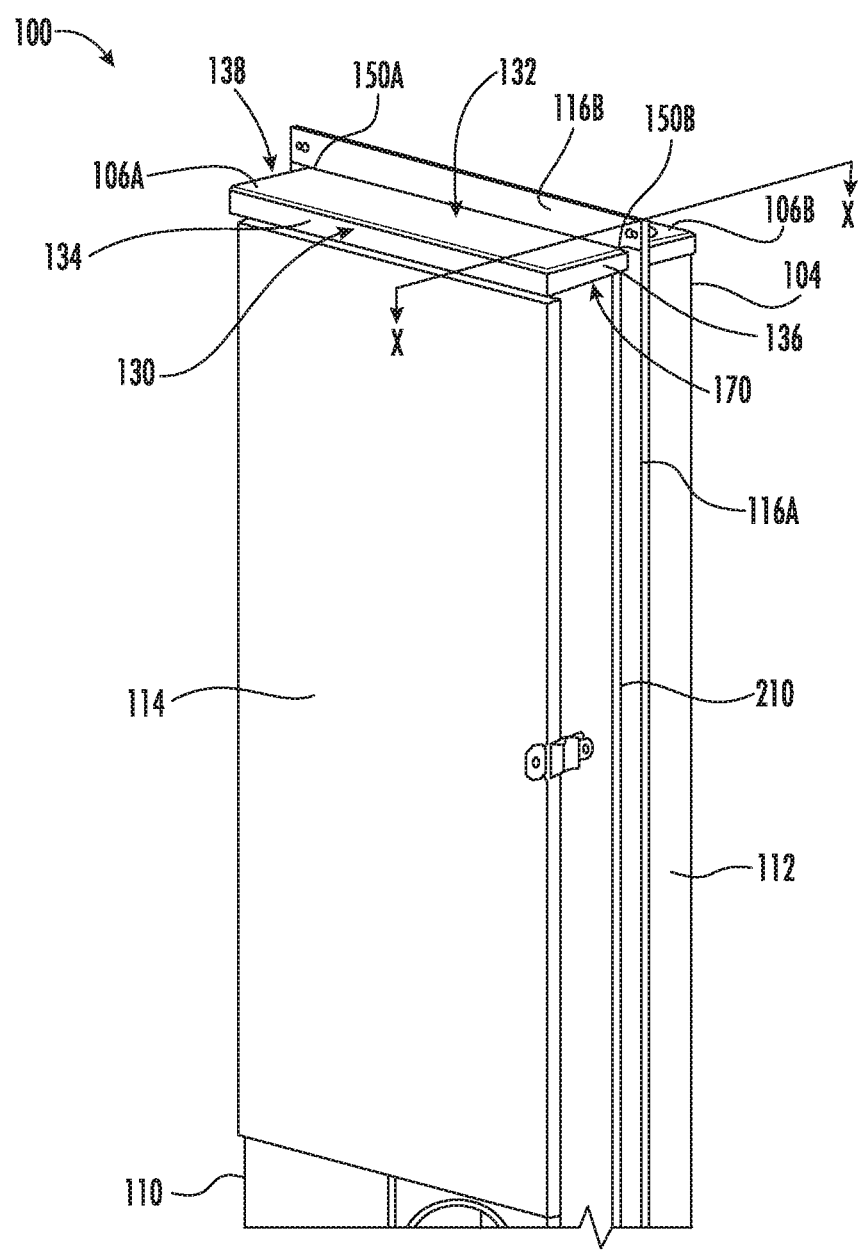
FIG. 1 is a front, perspective view of an example embodiment of an electrical panel according to the present disclosure, which includes a front door of the electrical panel illustrated in a closed position.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

DETAILED DESCRIPTION

Numerous embodiments of a water barrier system for use with an electrical panel in accordance with the present disclosure will now be described more fully hereinafter with reference to the accompanying drawings, in which preferred embodiments of the present disclosure are presented. The water barrier system of the present disclosure may, however, be embodied in many different forms and should not be construed as being limited to the embodiments set forth herein. Rather, these embodiments are provided so that this disclosure will convey certain example aspects of the water barrier system to those skilled in the art. In the drawings, like numbers refer to like elements throughout unless otherwise noted.

As will be described in greater detail below, in various embodiments, the water barrier system of the present disclosure is used in conjunction with an electrical panel to direct (e.g., prevent, inhibit, control, etc.) water intrusion into and within the electrical panel (the terms direct, directing, prevent, preventing, inhibit, inhibiting, control, and controlling are used interchangeably herein without the intent to limit). That is, in some embodiments, the water barrier system of the present disclosure provides one or more barriers to prevent, or at least inhibit, water from entering the electrical panel, and/or to keep water, which has entered the electrical panel, from entering a specific portion of an interior portion of the electrical panel, and/or to direct the flow or drainage of the water out of the electrical panel and away from the electrical components located within the electrical panel (e.g., the water barrier system directs the flow or drainage of water out of the electrical panel, away from the electrical components located within the electrical panel, and/or away from the interior wall cavity of the structure in which the panel is mounted).

Thus, in contrast with known, conventional electrical panels that primarily utilize flat top and bottom surfaces, which do not provide any barrier to water entering a specific portion of the interior portion of the panel, and do not direct the drainage of water out of the panel (e.g., water is free to flow to any area inside the panel and drain out any opening located in the electrical panel), the electrical panel according to the present disclosure prevents, or at least inhibits, the migration of water into the electrical panel, the free flow of water to any area inside the panel, and/or directs drainage of the water out of the panel.

Figure 2:
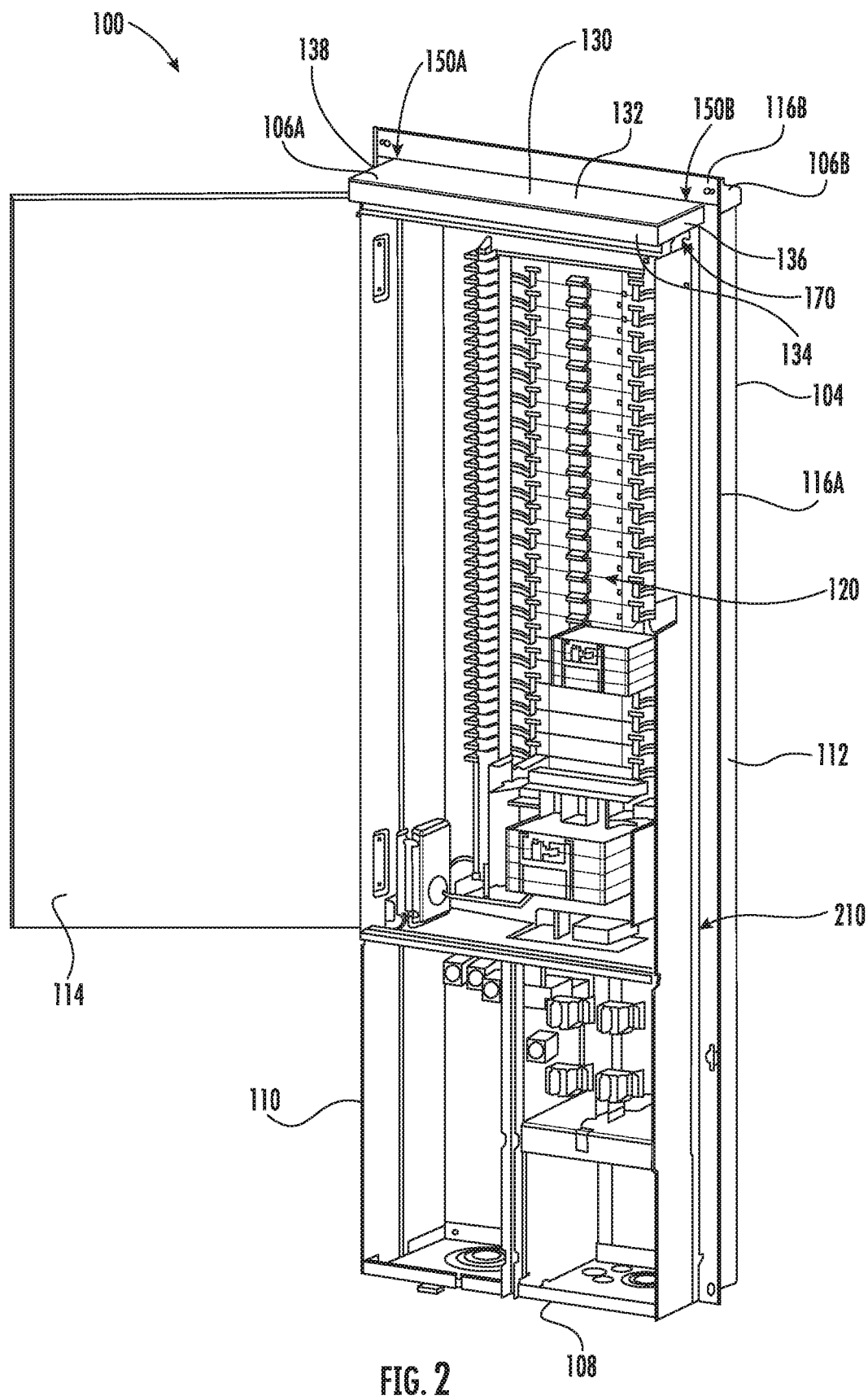
FIG. 2 is a front, perspective view of the electrical panel shown in FIG. 1, the front door of the electrical panel illustrated in an opened position, various doors (e.g., meter door, load door, auxiliary cover, etc.) removed.

Referring now to FIGS. 1 and 2, an exemplary electrical panel 100 according to the present disclosure is shown. In use, as will be described in greater detail herein, the electrical panel 100 may include one or more water barrier features to control the movement of water relative to the electrical panel 100.

As illustrated, the electrical panel 100 may include a back surface 104, a top surface 106 (FIG. 9), a bottom surface 108 (FIG. 2), first and second side surfaces 110, 112, and a front surface 114. In use, the front surface 114 may be adapted and configured as one or more doors. That is, as shown, in one embodiment, the front surface 114 may be pivotably coupled to the first side surface 110 so that an interior portion 120 (FIG. 2) of the electrical panel 100 may be accessed.

The electrical panel 100 may also include a top cover 130 for operably covering and/or coupling to at least a portion of the top surface 106 of the electrical panel 100 (e.g., front portion 106A of the top surface 106, as will be described in greater detail below). Referring to FIGS. 3-7, the top cover 130 may include a top surface 132, a front surface 134, and first and second side surfaces 136, 138. In one embodiment, as illustrated, the front surface 134 and the first and second side surfaces 136, 138 may be in the form of ledges descending from the top surface 132. In use, the top cover 130 is coupled to the panel 100 and acts to at least partially overlap and/or project beyond the top surface 106, the front surface 114, and the first and second side surfaces 110, 112 of the electrical panel 100.

The electrical panel 100 may also include flanges 116 for securing the electrical panel 100 to the surrounding structure (e.g., studs) in a building. The flanges 116 may extend from one or more of the top, bottom and first and second side surfaces 106, 108, 110, 112 of the electrical panel 100. As illustrated, in one embodiment, the flanges 116 may be provided in multiple parts. That is, as illustrated, electrical panel 100 may include one or more flanges 116A extending from the bottom and first and second side surfaces 108, 110, 112 of the electrical panel 100 for securing the electrical panel 100 to the surrounding structure (e.g., studs) in a building. In addition, the top cover 130 may include a flange 116B for securing the top cover 130 of the electrical panel 100 to the surrounding structure (e.g., studs) in a building. In use, as will be described herein, the flanges 116A, 116B may provide a secondary function to act as flashing. Additionally, for purposes of the present disclosure, the flanges 116 may lie on a plane which divides the electrical panel 100 into front and rear portions, as will be described in greater detail below.

It should be appreciated that the illustrated electrical panel 100 is but one example and that the electrical panel may take any form, thus the present disclosure should not be limited to any one electrical panel unless especially claimed.

Referring to FIGS. 1-8, in one embodiment, the electrical panel 100 may include one or more features for inhibiting water from entering through the top surface 106 of the electrical panel 100. In one embodiment, as illustrated, the top surface 132 of the top cover 130 may include one or more weep holes, such as first and second weep holes 150A, 150B (FIGS. 4-7) for enabling, for example, water to pass through the top cover 130 of the electrical panel 100. As illustrated, the first and second weep holes 150A, 150B are positioned adjacent to the first and second side surfaces 136, 138 of the top cover 130, respectively, and adjacent to the flanges 116B associated with the top cover 130 (e.g., weep holes 150A, 150B may be positioned adjacent to the intersection of the flange 116B and the first and second side surfaces 136, 138).

Figure 3:
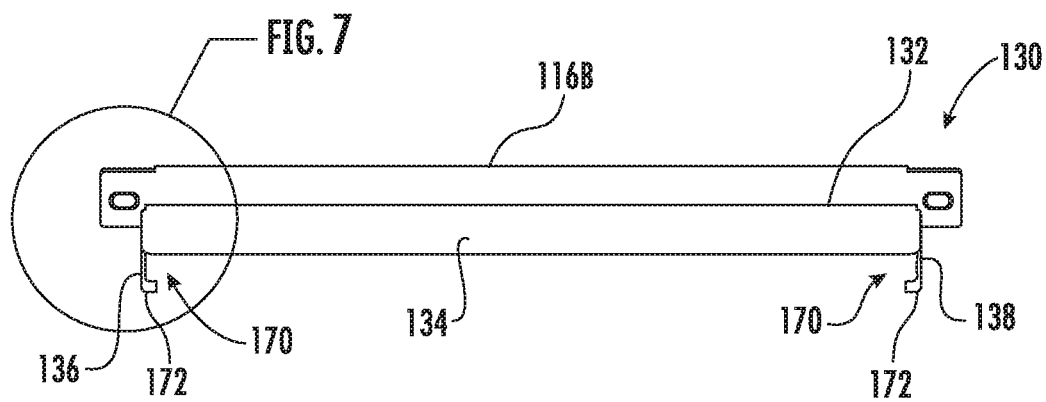
FIG. 3 is a front view of an example embodiment of a cover for use with the electrical panel shown in FIG. 1.
Figure 4:
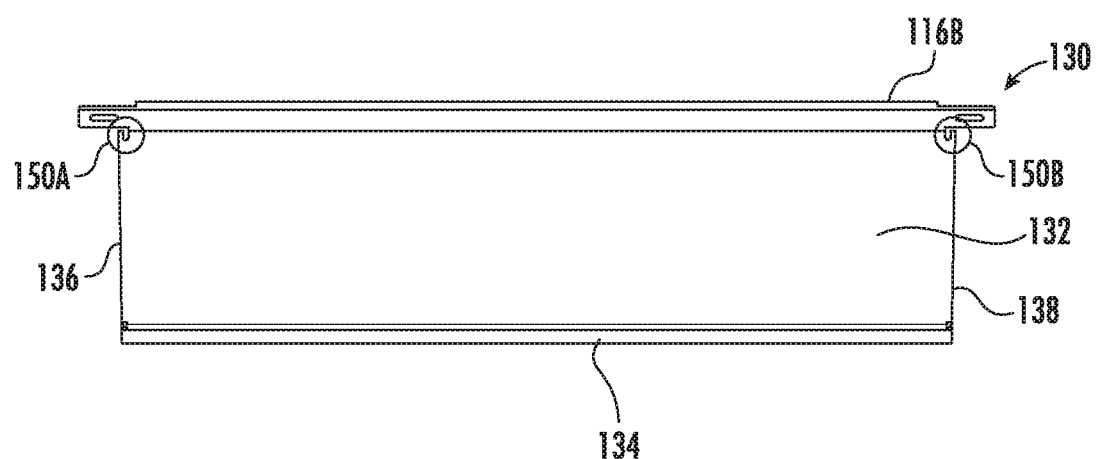
FIG. 4 is a top view of the cover shown in FIG. 3.
Figure 5:
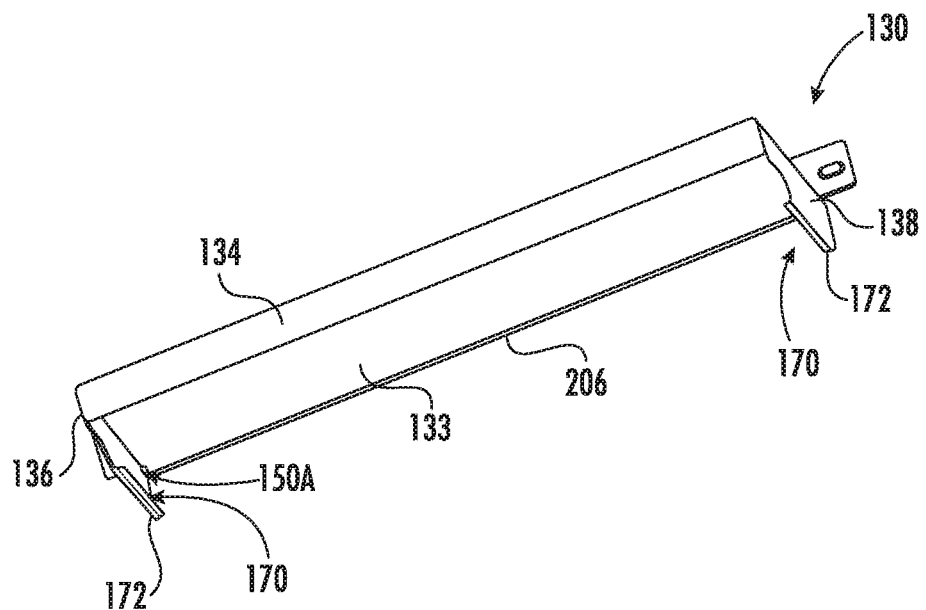
FIG. 5 is a bottom perspective view of the cover shown in FIG. 3.
Figure 7:
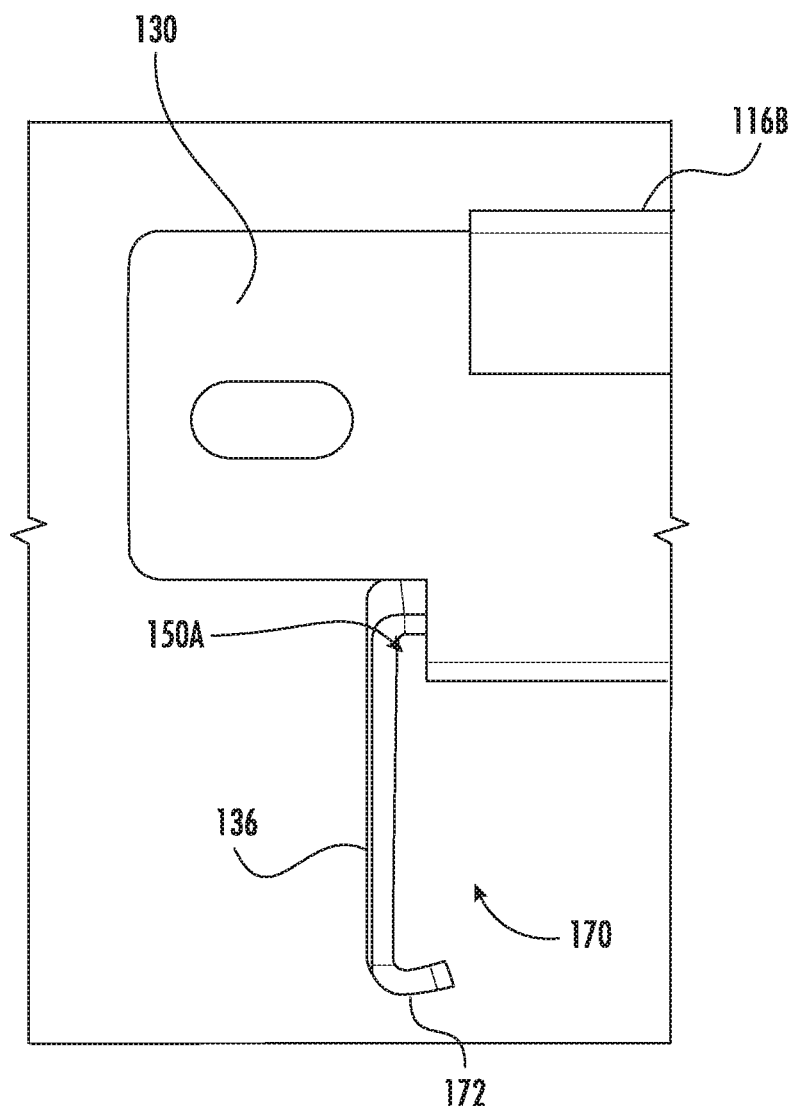
FIG. 7 is a detailed, rear view of the cover shown in FIG. 3.
Figure 8:
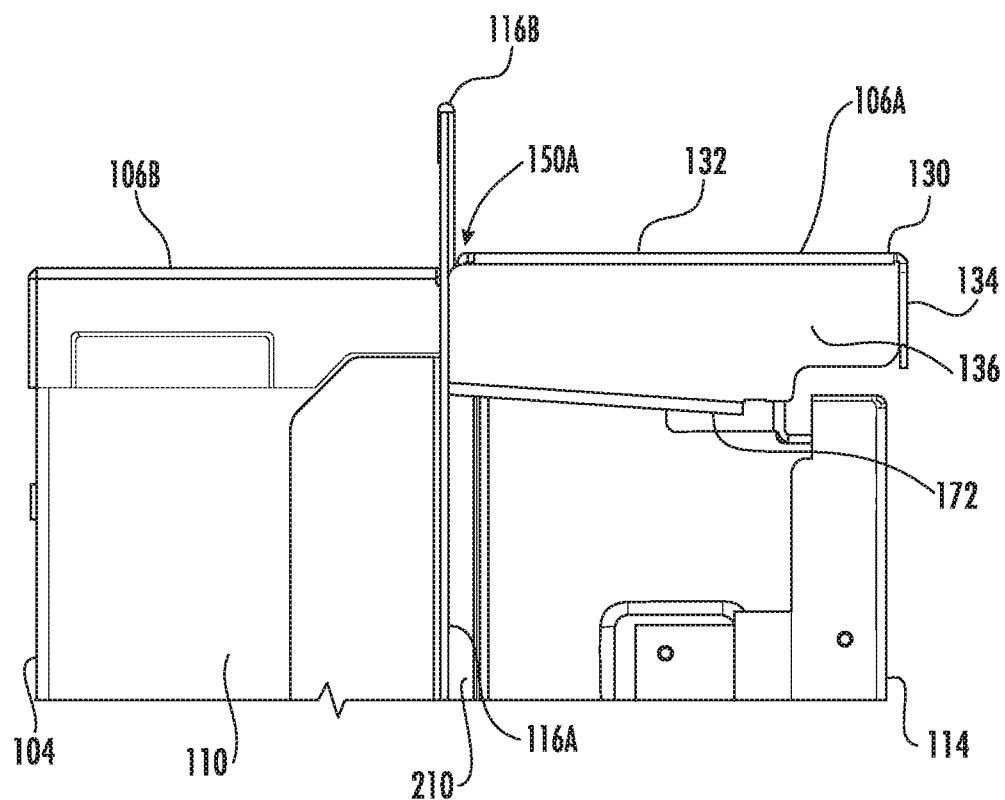
FIG. 8 is a side view of the electrical panel shown in FIG. 1.

Additionally, as illustrated in FIGS. 3, 5 and 7, the electrical panel 100 may include one or more channels 170. In one embodiment, the electrical panel 100 may include first and second channels 170 positioned below the first and second weep holes 150A, 150B, respectively, to catch water passing therethrough. In one example embodiment, as illustrated, the top cover 130 includes first and second channels 170 formed in or attached to the first and second side surfaces 136, 138, respectively. The channels 170 may be formed by any mechanism now known or hereafter developed. As illustrated, the channel 170 may be formed by inwardly curving a bottom portion of the side surfaces 136, 138 (e.g. a rolled edge) so that a channel is formed for collecting any water that passes through the weep holes 150A, 150B. In other words, any water that passes through weep holes 150A, 150B, is captured by the channels 170 since the channels 170 are located directly below the weep holes 150A, 150B. The channels 170 may extend from the flange 116B associated with the top cover 130 to the front surface 114 of the electrical panel 100 (or a portion thereof). Additionally, each channel 170 may be inclined or angled downward from the flange 116B to the front surface 114 of the electrical panel 100 to direct water outward towards the front of the electrical panel 100. It should be noted that the channels 170 may be positioned anywhere on the electrical panel 100 so long as they are in fluid communication with the weep holes 150A, 150B. For example, the channels may be formed in the first and second side surfaces 110, 112 of the electrical panel 100.

In use, the weep holes 150A, 150B and channels 170 control (e.g., direct) water migration from the top surface 132 of the top cover 130. That is, in use, the combination of weep holes 150A, 150B formed in the top surface 132 of the top cover 130 and channels 170 located on the side surfaces 136, 138 of the top cover 130 enable water to pass through the top surface 132 of the top cover 130 into the channels 170 and eventually down and away from any of the components located therein. In this manner, the weep holes 150A, 150B and channels 170 control (e.g., direct) water that encounters or comes into contact with the exposed front portion 106A of the top surface, which may be exposed to the environmental elements (e.g., portion of the top surface positioned in front of the flange 116). In particular, the weep holes 150A, 150B and channels 170 control (e.g., direct) water that encounters or comes into contact with the electrical panel 100 along a front surface of the flange 116 due to, for example, improper installation of the panel (e.g., existence of gaps between, for example, the exterior surface of the panel 100 and the surrounding layers of material, as previously mentioned). In addition, any water that comes into contact with the top surface 132 of the top cover 130 that does not make its way into weep holes 150A, 150B, may be directed over the side surfaces 136, 138 of the top cover 130. When this water reaches the lower edge 172 of the channel 170, it will be directed outward towards the front of the electrical panel 100.

Figure 9:
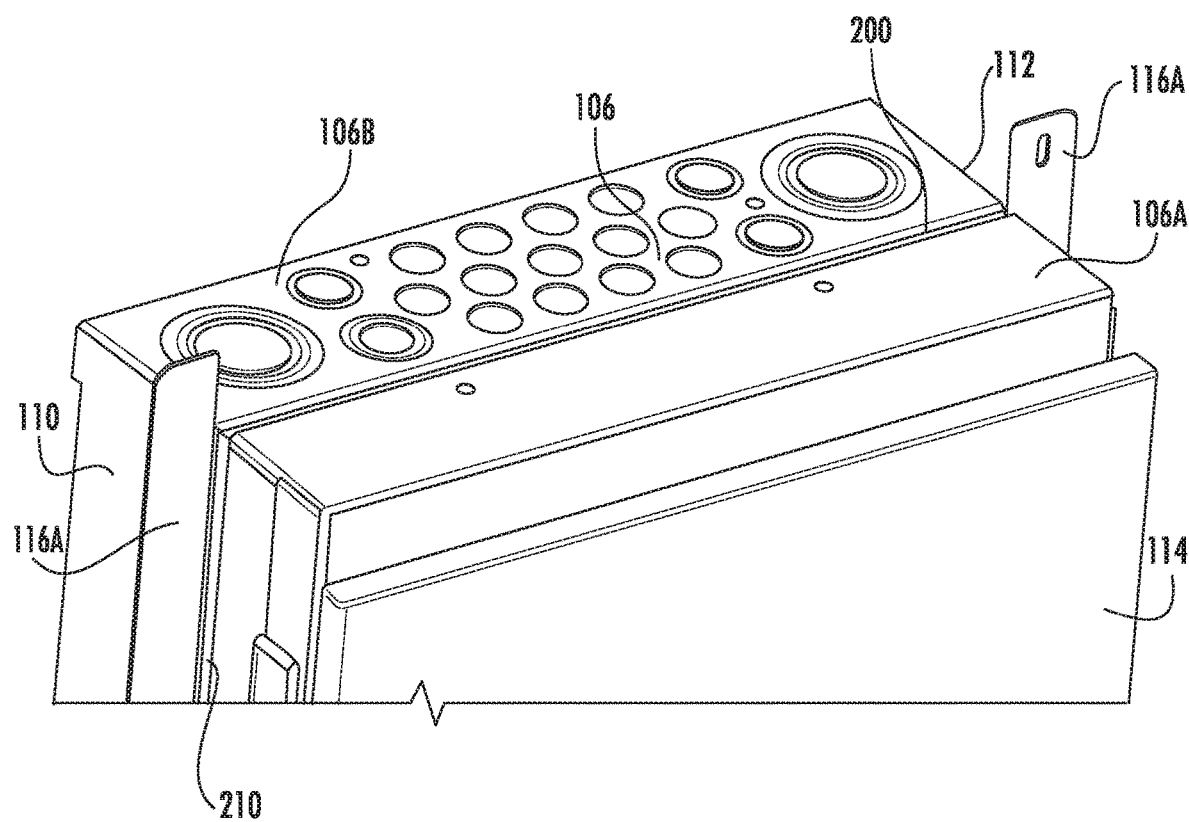
FIG. 9 is a partial, top perspective view of the electrical panel shown in FIG. 1, the electrical panel shown with the cover removed.

Additionally, and/or alternatively, the electrical panel 100 may include one or more features for controlling (e.g., directing) water that penetrates or otherwise encounters or comes into contact with the rear portion 106B of the top surface 106 of the electrical panel 100 (e.g., portion of the top surface 106 positioned behind the flange 116B). Referring to FIG. 9, the illustrated example embodiment of the electrical panel 100 may include one or more lateral troughs 200 formed in the top surface 106 of the electrical panel 100. The lateral trough 200 can extend the entire width of the electrical panel 100 (e.g., from the first side surface 110 to the second side surface 112), although it is envisioned that the lateral trough 200 may only extend a partial width thereof.

Referring to FIG. 9, as illustrated, in use, the lateral trough 200 may be positioned adjacent to the flange 116 (e.g., flange 116B associated with the top cover 130 when the top cover 130 is coupled to the electrical panel 100). That is, in use, the lateral trough 200 is positioned adjacent to the flange 116B extending from the top surface 132 of the top cover 130, when the top cover 130 is coupled to the electrical panel 100). The lateral trough 200 extends beneath the portion of the flange 116B so that the lateral trough 200 is in fluid communication with the rear portion 106B of the top surface 106 of the electrical panel 100. That is, in use, the lateral trough 200 formed in the top surface 106 of the electrical panel 100 may collect and subsequent direct any water that penetrates or otherwise encounters or comes into contact with the rear portion 106B of the top surface 106 of the electrical panel 100 (e.g., portion of the top surface 106 positioned behind the flange 116B).

Additionally, as illustrated, the electrical panel 100 may include one or more vertical channels 210 (FIGS. 1, 2, 8, and 9) formed in the first and second side surfaces 110, 112, respectively. In use, upper ends of the vertical channels 210 are positioned in fluid communication with ends of the lateral trough 200 formed in the top surface 106 of the electrical panel 100. In this manner, any water entering the lateral trough 200 from the top surface 106 of the electrical panel 100 is directed into the vertical channels 210 formed in the first and second side surfaces 110, 112.

In one example embodiment, the first and second vertical channels 210 formed in or attached to the first and second side surfaces 110, 112 may extend the full height of the electrical panel 100 (e.g., extend from the top surface 106 to the bottom surface 108), although it is envisioned that the vertical channels 210 may only extend a partial height thereof.

Figure 10:
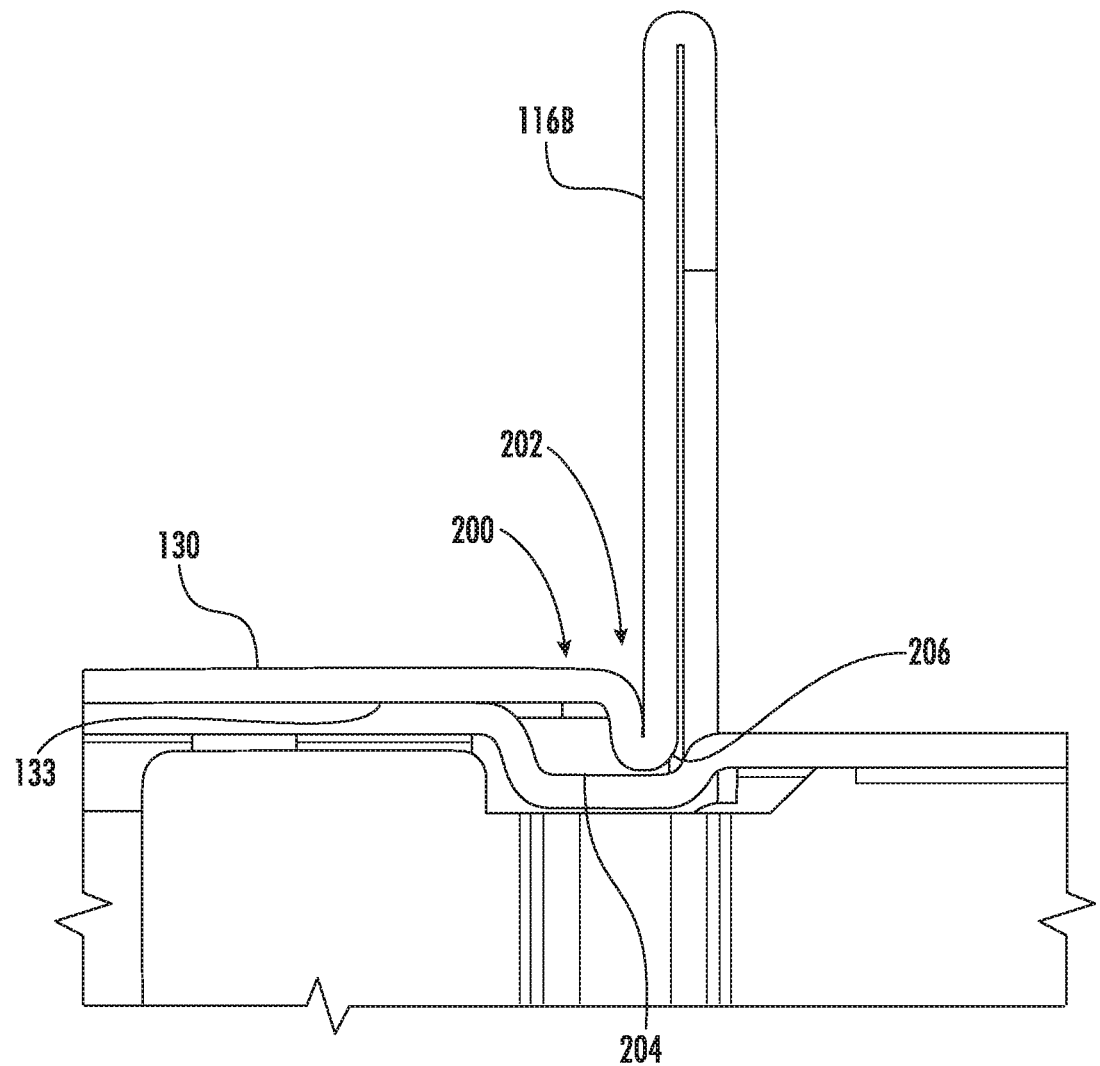
FIG. 10 is a partial, cross-sectional view of a top portion of the electrical panel shown in FIG. 1 taken along line X-X shown in FIG. 1.

Additionally, referring to FIG. 10, the top cover 130 may also include a lateral trough 202. As illustrated, the lateral trough 202 formed in the top cover 130 may be formed or otherwise positioned adjacent to the flange 116B and the lateral trough 202 can extend the entire width of the top cover 130 (e.g., from the first side surface 136 to the second side surface 138), although it is envisioned that the lateral trough 202 may only extend a partial width thereof. In use, the lateral trough 202 formed in the top surface 132 of the cover 130 may direct or control water mitigation that encounters or comes into contact with the top surface 132 of the top cover 130.

Figure 6:
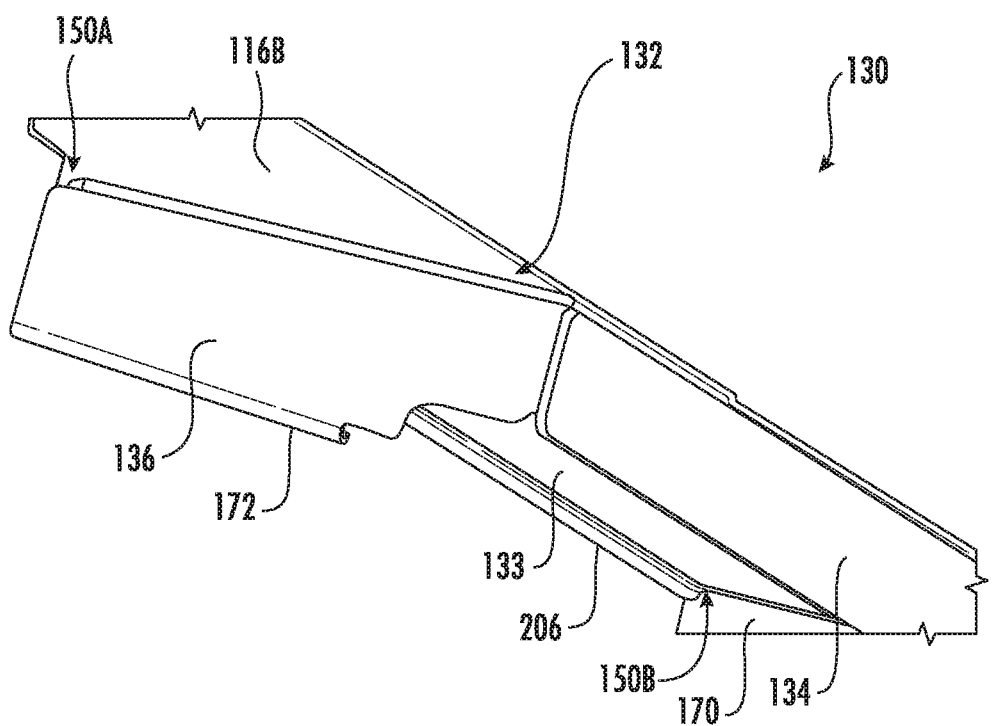
FIG. 6 is a detailed, bottom perspective view of the cover shown in FIG. 3.

As illustrated in FIGS. 5, 6, and 10, the top cover 130 may include a projection 206 extending therefrom. In use, the projection 206 is sized and configured to sit within the lateral trough 200 formed in the top surface 106 of the electrical panel 100 when the top cover 130 is coupled to the electrical panel 100. By positioning the projection 206 into the lateral trough 200, capillary action assists with directing water from the lateral trough 200 and into the vertical channels 210. As illustrated in FIG. 10, in the illustrated example embodiment, the bottom surface 204 of the lateral trough 202 formed in the top cover 130 may extend below a bottom surface 133 of the top cover 130 thereby defining the projection 206. Additionally, and/or alternatively, as will be appreciated by one of ordinary skill in the art, the lateral trough 200 formed in the top surface 106 of the electrical panel 100 may include a sloped surface for directing water into the vertical channels 210 formed in the first and second sides surfaces 110, 112, respectively.

In use, by positioning the lateral trough 200 formed in the top surface 106 of the electrical panel 100 adjacent to the flange 116B, and by placing the lateral trough 200 formed in the top surface 106 of the electrical panel 100 into fluid communication with the vertical channels 210 formed in the first and second side surfaces 110, 112, respectively, of the electrical panel 100, the lateral trough 200 and the vertical channels 210 direct water from the rear portion 106B (e.g., portion of the top surface 106 positioned behind the flange 116B) of the top surface 106 of the electrical panel 100. That is, in use, the combination of the lateral trough 200 formed in the top surface 106 of the electrical panel 100 and the vertical channels 210 in the side surfaces 110, 112, respectively, of the electrical panel 100 enable any water which may enter, for example, along a rear surface of the flange 116B, to pass from the rear portion 106B of the top surface 106 of the electrical panel 100 into the lateral trough 200 and then into the vertical channels 210 and eventually down from the electrical panel 100 and away from any of the components located therein. In this manner, the lateral trough 200 and the vertical channels 210 control (e.g., direct) any water that may encounter or come into contact with the rear portion 106B of the top surface 106 of the electrical panel 100 and thus prevent, or at least inhibit, migration of water towards the back side of the electrical panel 100, which may be positioned within an interior wall portion of a building. As such, the combination of the lateral trough 200 and the vertical channels 210 prevent, or at least inhibit, water from draining into the interior wall portion or cavity of the building to which the panel 100 is mounted.

Figure 11:
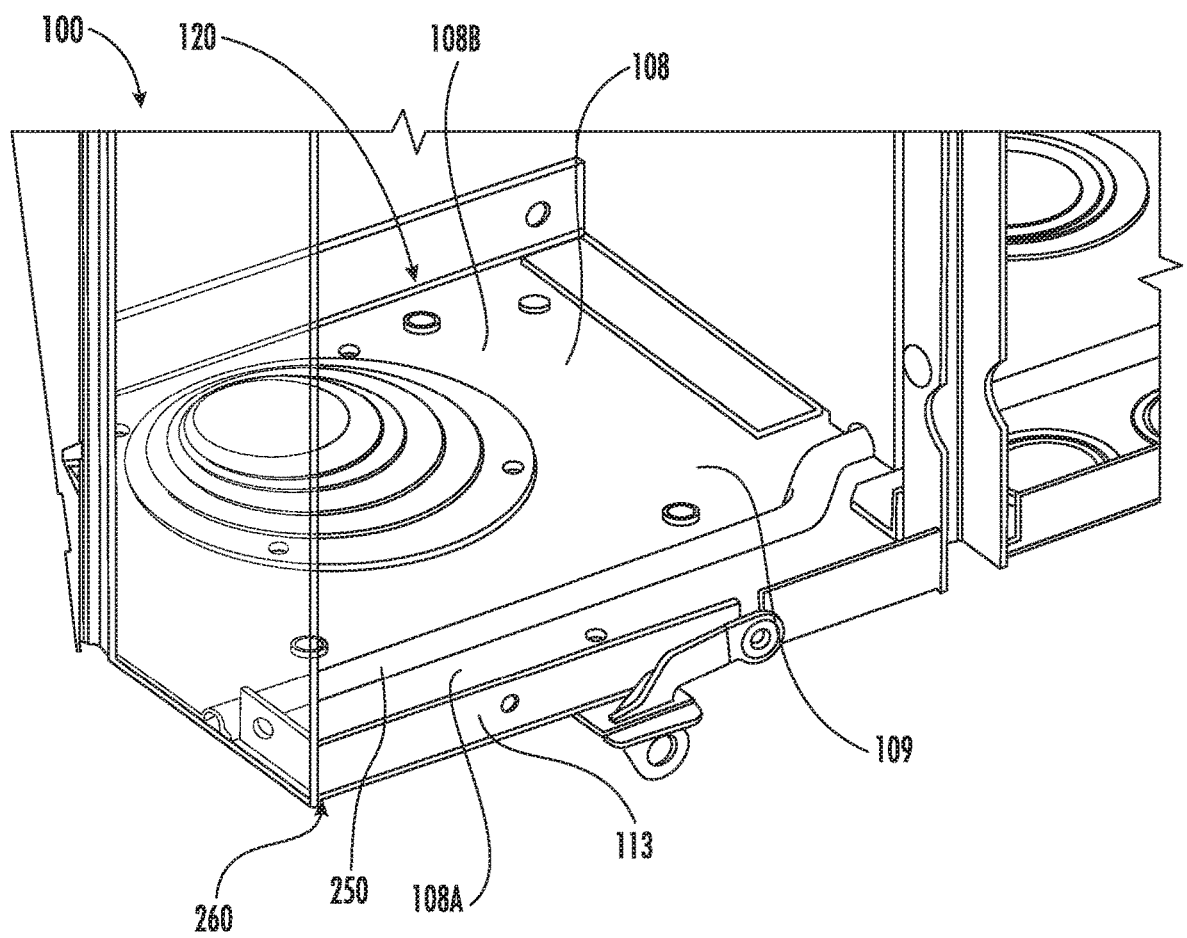
FIG. 11 is a detailed, perspective view of a bottom portion of the electrical panel shown in FIG. 1, the electrical panel shown with various doors (e.g., load door, auxiliary cover, etc.) removed.

Additionally, and/or alternatively, referring to FIG. 11, the illustrated example embodiment of the electrical panel 100 may include one or more features to prevent, or at least inhibit, migration of water that has entered the interior portion 120 of the electrical panel 100. For example, if water accumulates on a flat surface such as, for example, the bottom surface 108 or the like of the electrical panel 100, the one or more features prevent, or at least inhibit, water from migrating towards a rear portion of the electrical panel 100.

In use, the one or more features may be any suitable feature now known or hereafter developed to prevent or inhibit water from moving from the front portion of the electrical panel 100 towards the rear portion of the electrical panel 100. As illustrated in FIG. 11, in one embodiment, the one or more features may be in the form of one or more barriers, projections, raised lips, ridges, wall, or the like (used interchangeably herein without the intent to limit) 250 formed in or coupled to a flat surface such as, for example, the bottom surface 108 or the like of the electrical panel 100. As illustrated, in one example embodiment, the barrier 250 is formed in or coupled to an interior portion 109 of the bottom surface 108 of the electrical panel 100. The barrier 250 may extend the entire width of the electrical panel 100 (e.g., from the first side surface 110 to the second side surface 112), although it is envisioned that the barrier 250 may only extend a partial width thereof. In one embodiment, the barrier 250 is positioned forward of the flange 116 (e.g., between the position of the flange 116 and the front surface 114 of the electrical panel 100). In this manner, if any water enters the electrical panel 100, the water is maintained in the front portion 108A of the bottom surface 108 of the electrical panel 100 and thus is prevented from moving towards the rear portion 108B of the bottom surface 108 and into contact with electrical components located within the electrical panel 100 and/or into the wall cavity of the structure in which the panel 100 is mounted.

The barriers 250 may be formed into the surfaces (e.g., bottom surface 108) of the electrical panel 100 or coupled to the surfaces (e.g., bottom surface 108) of the electrical panel 100 by any suitable mechanism now known or hereafter developed including, for example, stamping, welding, fastening, rolling, etc. Alternatively, the one or more features could be in the form of a channel or trough with a slope for directing water to a drainage hole.

As illustrated in FIG. 11, the electrical panel 100 may also include one or more ledges 113. In use, one or more gaps 260 may be formed in between the side surfaces 110, 112 of the electrical panel 100 and the ledges 113 to enable any water collected into the front portion 108A to escape. Alternatively, it is envisioned, that other mechanisms may be incorporated for enabling water to escape including, for example, one or more drainage holes (e.g., weep holes or the like) formed in the bottom surface of the electrical panel. As will be appreciated by one of ordinary skill in the art, the front portion 108A of the bottom surface 108 of the electrical panel 100 may include a sloped surface extending, for example, from the barrier 250 so that any water that encounters or comes into contact with the bottom surface 108 of the electrical panel 100 may be directed (e.g., funneled) through the gaps 260 or drainage holes and out of the electrical panel 100.

While the present disclosure makes reference to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

What is claimed is:

1. An electrical panel comprising:
   a back surface, a front surface, a top surface, a bottom surface, and first and second side surfaces defining an interior portion to house one or more electrical components, the electrical panel further including one or more flanges extending from the surfaces of the electrical panel to couple the electrical panel to a structure, the flanges dividing the electrical panel into front and rear portions; and
   a barrier extending from an interior surface of the electrical panel, the barrier being adapted and configured to inhibit migration of water from the front portion of the electrical panel to the rear portion of the electrical panel,
   wherein the barrier is located between the one or more flanges and the front surface of the electrical panel.

2. The electrical panel of claim 1, wherein the barrier extends from the interior surface of the bottom surface of the electrical panel, the barrier being adapted and configured to inhibit water from migrating towards the rear portion of the electrical panel along the bottom surface of the panel.

3. The electrical panel of claim 1, wherein the electrical panel includes one or more drainage holes or gaps in fluid communication with the front portion of the electrical panel, the one or more drainage holes or gaps being adapted and configured to allow water out of the electrical panel.

4. The electrical panel of claim 1, further comprising a cover to at least partially cover a portion of the top surface of the electrical panel, the cover including a top surface, a front surface, first and second side surfaces, and first and second weep holes, the first and second weep holes being adapted and configured to enable water to pass through the top surface of the cover, the first and second weep holes positioned adjacent to first and second side surfaces, respectively, of the cover.

5. The electrical panel of claim 4, wherein the cover further includes first and second channels in fluid communication with the first and second weep holes, respectively, the first and second channels are located on the first and second side surfaces, respectively, of the cover.

6. The electrical panel of claim 1, wherein the electrical panel further includes a trough formed in the top surface of the electrical panel, the trough extending a width of the electrical panel.

7. The electrical panel of claim 6, wherein the trough is positioned adjacent to a portion of the flange extending from the top surface of the electrical panel, the trough extending beneath the portion of the flange so that the trough is in fluid communication with the rear portion of the top surface of the electrical panel.

8. The electrical panel of claim 7, wherein the electrical panel further includes one or more vertically extending channels formed in one of the first and second side surfaces of the electrical panel, the trough formed in the top surface of the electrical panel being in fluid communication with the one or more vertically extending channels.

9. The electrical panel of claim 8, further comprising a cover to at least partially cover a portion of the top surface of the electrical panel, the cover including a projection sized and configured to sit within the trough formed in the top surface of the electrical panel when the cover is coupled to the electrical panel.

10. An electrical panel comprising:
    a back surface, a front surface, a top surface, a bottom surface, and first and second side surfaces defining an interior portion to house one or more electrical components, the electrical panel further including one or more flanges extending from the surfaces of the electrical panel to couple the electrical panel to a structure, the flanges dividing the electrical panel into front and rear portions; and
    a cover to at least partially cover a portion of the top surface of the electrical panel, the cover including a top surface, a front surface, first and second side surfaces, and first and second weep holes, the first and second weep holes being adapted and configured to enable water to pass through the top surface of the cover, the first and second weep holes positioned adjacent to first and second side surfaces, respectively, of the cover, the cover further includes first and second channels in fluid communication with the first and second weep holes, respectively.

11. The electrical panel of claim 10, wherein the first and second channels are located on the first and second side surfaces, respectively, of the cover.

12. The electrical panel of claim 11, wherein the first and second channels include an angled surface extending from the flanges towards the front surface of the electrical panel.

13. The electrical panel of claim 10, wherein the electrical panel includes a barrier extending from an interior surface of the electrical panel, the barrier being adapted and configured to inhibit migration of water from the front portion of the electrical panel to the rear portion of the electrical panel, the barrier being located between the one or more flanges and the front surface of the electrical panel.

14. The electrical panel of claim 13, wherein the barrier extends from the interior surface of the bottom surface of the electrical panel.

15. The electrical panel of claim 10, wherein the electrical panel further includes a trough formed in the top surface of the electrical panel, the trough extending a width of the electrical panel.

16. The electrical panel of claim 15, wherein the trough is positioned adjacent to a portion of the flange extending from the top surface of the electrical panel, the trough extending beneath the portion of the flange so that the trough is in fluid communication with the rear portion of the top surface of the electrical panel.

17. The electrical panel of claim 16, wherein the electrical panel further includes one or more vertically extending channels formed in one of the first and second side surfaces of the electrical panel, the trough formed in the top surface of the electrical panel being in fluid communication with the one or more vertically extending channels.

18. The electrical panel of claim 17, wherein the cover includes a projection sized and configured to sit within the trough formed in the top surface of the electrical panel when the cover is coupled to the electrical panel.

19. An electrical panel comprising:
a back surface, a front surface, a top surface, a bottom surface, and first and second side surfaces defining an interior portion to house one or more electrical components, the electrical panel further including one or more flanges extending from the surfaces of the electrical panel to couple the electrical panel to a structure, the flanges dividing the electrical panel into front and rear portions; and
wherein the electrical panel includes a trough formed in the top surface of the electrical panel, the trough extending a width of the electrical panel; and
wherein the trough is positioned adjacent to a portion of the flanges extending from the top surface of the electrical panel, the trough extending beneath the portion of the flanges so that the trough is in fluid communication with the rear portion of the top surface of the electrical panel.

20. The electrical panel of claim 19, wherein the electrical panel further includes one or more vertically extending channels formed in one of the first and second side surfaces of the electrical panel, the trough formed in the top surface of the electrical panel being in fluid communication with the one or more vertically extending channels.

21. The electrical panel of claim 20, further comprising a cover to at least partially cover a portion of the top surface of the electrical panel, the cover including a projection sized and configured to sit within the trough formed in the top surface of the electrical panel when the cover is coupled to the electrical panel.

22. The electrical panel of claim 19, further comprising a cover to at least partially cover a portion of the top surface of the electrical panel, the cover including a top surface, a front surface, first and second side surfaces, and first and second weep holes, the first and second weep holes being adapted and configured to enable water to pass through the top surface of the cover, the first and second weep holes positioned adjacent to first and second side surfaces, respectively, of the cover.

23. The electrical panel of claim 22, wherein the cover further includes first and second channels in fluid communication with the first and second weep holes, respectively, the first and second channels are located on the first and second side surfaces, respectively, of the cover.

24. The electrical panel of claim 19, wherein the electrical panel includes a barrier extending from an interior surface of the electrical panel, the barrier being adapted and configured to inhibit migration of water from the front portion of the electrical panel to the rear portion of the electrical panel.

25. The electrical panel of claim 24, wherein the barrier extends from the interior surface of the bottom surface of the electrical panel.

26. The electrical panel of claim 24, wherein the barrier is located between the one or more flanges and the front surface of the electrical panel.

\* \* \* \* \*